(12) United States Patent
Honma et al.

(10) Patent No.: US 6,549,760 B1
(45) Date of Patent: Apr. 15, 2003

(54) COMMUNICATIONS DEVICE

(75) Inventors: Yasuyuki Honma, Chofu (JP); Yukinori Hirai, Chofu (JP)

(73) Assignee: Mitsumi Electric Co., Ltd., Chofu (JP)

( * ) Notice: Subject to any disclaimer, the term of this patent is extended or adjusted under 35 U.S.C. 154(b) by 0 days.

(21) Appl. No.: 09/295,861

(22) Filed: Apr. 21, 1999

(30) Foreign Application Priority Data

Apr. 24, 1998 (JP) ............................................ 10-115516

(51) Int. Cl.⁷ .............................. H03C 7/02; H04B 1/02
(52) U.S. Cl. ...................... 455/101; 455/78; 455/277.1
(58) Field of Search ........................... 455/562, 83, 84, 455/78, 101, 133, 277.1, 272, 277.2; 342/374; 343/751, 876

(56) References Cited

U.S. PATENT DOCUMENTS

| | | | | |
|---|---|---|---|---|
| 4,908,587 A | * | 3/1990 | Davcev ........................ 333/101 |
| 5,194,873 A | * | 3/1993 | Sickles, II .................... 342/374 |
| 5,635,684 A | * | 6/1997 | Fukuzaki ...................... 178/19 |
| 5,715,525 A | * | 2/1998 | Tarusawa et al. ............. 455/101 |
| 5,745,479 A | * | 4/1998 | Burns et al. .................. 370/245 |
| 5,822,684 A | * | 10/1998 | Kitakubo ...................... 455/78 |
| 5,907,545 A | * | 5/1999 | Arai et al. ................... 370/342 |
| 5,913,153 A | * | 6/1999 | Nakamoto et al. ............ 455/78 |
| 6,009,307 A | * | 12/1999 | Granata et al. ............. 455/13.3 |
| 6,055,422 A | * | 4/2000 | Saitoh ....................... 455/277.1 |

\* cited by examiner

*Primary Examiner*—Dwayne Bost
*Assistant Examiner*—Joy Contee
(74) *Attorney, Agent, or Firm*—Andrus, Sceales, Starke & Sawall, LLP

(57) ABSTRACT

A communications device for communicating by selecting a predetermined antenna from a plurality of antennae has a first and a second switch, each switch comprising one moving contact and two fixed contacts. The moving contact of the first switch is connected to a first antenna, the first fixed contact of the first switch is connected to a transmitter circuit, the second fixed contact of the first switch is connected to the first fixed contact of the second switch, the moving contact of the second switch is connected to a receiver circuit, and the second fixed contact of the second switch is connected to a second antenna. By switching as appropriate between antennae the attenuation of transmission and reception signals caused by the switches can be reduced.

6 Claims, 6 Drawing Sheets

FIG. 3

| TRANSMISSION ATTENUATION | FIRST SWITCH ATTENUATION |
|---|---|
| RECEPTION ATTENUATION WITH FIRST ANTENNA | FIRST SWITCH ATTENUATION + SECOND SWITCH ATTENUATION |
| RECEPTION ATTENUATION WITH SECOND ANTENNA | SECOND SWITCH ATTENUATION |

F I G. 6

| TRANSMISSION ATTENUATION | FIRST SWITCH ATTENUATION+SECOND SWITCH ATTENUATION |
|---|---|
| RECEPTION ATTENUATION | FIRST SWITCH ATTENUATION+SECOND SWITCH ATTENUATION |

COMMUNICATIONS DEVICE

BACKGROUND OF THE INVENTION

1. Field of the Invention

The present invention relates generally to a communications device, and more particularly, to a communications device for communicating by selecting a predetermined antenna from a plurality of antennae.

2. Description of the Related Art

FIG. 4 is a block diagram of a conventional communications system. The conventional communications device 1 comprises a first antenna 2 and a second antenna 3 for transmitting and receiving; a switching circuit 4 for switching the first and second antennae 2, 3; a transmitter circuit 5 for supplying transmission signals to the first and second antennae 2, 3 via the switching circuit 4; a receiver circuit 6 supplied with reception signals received at the first and second antennae 2, 3 via the switching circuit 4; and a signal processing circuit 7 for modulating transmission signals and supplying them to the transmission circuit 5 and at the same time demodulating and outputting reception signals supplied from the receiver circuit 6.

The first antenna 2 comprises an antenna element capable of transmitting and receiving, the antenna element being used as a transmission antenna during transmission and as a reception antenna during reception.

The second antenna element chiefly comprises an antenna element for receiving, the antenna element being used as a reception antenna element during reception. Both the first and second antennae 2, 3 are connected to the switching circuit 4.

FIG. 5 is a block diagram of a conventional connection switching circuit. The connection switching circuit 4 comprises a first switch 11 for selecting one or the other of either antenna 2 or antenna 3 and a second switch 12 for selecting one or the other of either the transmitter circuit 5 or the receiver circuit 6.

The first switch 11 is an antenna selection switch. A first fixed contact t1 is connected to the first antenna 2, a second fixed contact is connected to the second antenna 3 and a moving contact t3 is connected to the second switch 12.

The moving contact t3 of the first switch 11 is connected to either the first fixed contact t1 or the second fixed contact t2 according to an antenna selection signal supplied from the signal processing circuit 7. When the antenna selection signal supplied by the signal processing circuit 7 is HIGH the moving contact t3 is connected to the first fixed contact t1; when the antenna selection signal supplied by the signal processing circuit 7 is LOW the moving contact t3 is connected to the second fixed contact t2.

The second switch 12 controls the switching between transmission and reception. A first fixed contact t11 is connected to the transmitter circuit 5, a second fixed contact t12 is connected to the receiver circuit 6 and a moving contact t13 is connected to the moving contact t3 of the first switch 11.

The moving contact t13 of the second switch 12 is connected to either the first fixed contact t11 or the second fixed contact t12 according to a transmission-reception switching control signal supplied from the signal processing circuit 7. When the transmission-reception switching control signal supplied by the signal processing circuit 7 is HIGH the moving contact t13 is connected to the first fixed contact t11; when the transmission-reception switching control signal supplied by the signal processing circuit 7 is LOW the moving contact t13 is connected to the second fixed contact t12.

The transmission circuit 5 comprises a power amplifier 21 and amplifies transmission signals generated by the signal processing circuit 7. It should be noted that the transmitter circuit 5 does not in fact comprise only the power amplifier 21 but also includes other circuits as well.

The receiver circuit 6 comprises a low-noise amplifier 22, and amplifies reception signals received by the first antenna 2 and the second antenna 3 and supplies them to the signal processing circuit 7. It should be noted that the receiver circuit 6 does not in fact comprise only the low-noise amplifier 22 but also includes other circuits as well.

A description will now be given of the signal processing circuit 7 with reference once more to FIG. 4.

As shown in FIG. 4, the signal processing circuit 7 has a transmission signal input terminal Ttx for inputting transmission signals; a reception signal output terminal Trx for outputting reception signals; a transmission enable signal input terminal Ttx-en to which is input a transmission enable signal for switching a processing mode of the signal processing circuit 7 to the transmit mode; and a reception enable signal input terminal Trx-en to which is input a reception enable signal for switching the signal processing mode of the signal processing circuit 7 to the receive mode.

When a signal is transmitted, the transmission enable signal input to the transmission enable signal input terminal Ttx-en is HIGH and the reception enable signal supplied to the reception enable signal input terminal Trx-en is LOW. As a result, the signal processing circuit 7 processing mode switches to the transmission mode, the transmission signal supplied to the transmission signal input terminal Tx is modulated and the modulated signal supplied to the connection switching circuit 4. Additionally, the signal processing circuit 7 sets the transmission-reception switching control signal supplied to the first switch 11 of the connection switching circuit 4 or the antenna selection signal supplied to the second switch 12 of the connection switching circuit 4 to HIGH.

Additionally, when a signal is received, the transmission enable signal supplied to the transmission enable signal input terminal Ttx-en is LOW and the reception enable signal supplied to the reception enable signal input terminal Trx-en is HIGH. As a result, the signal processing circuit 7 processing mode switches to receive mode, the reception signal supplied from the receiver circuit 6 is demodulated and the demodulated signal output from the reception signal output terminal Trx. Additionally, the signal processing circuit 7 sets the antenna switching control signal supplied to the first switch 11 of the switching control circuit 4 to LOW and sets the transmission-reception switching signal supplied to the second switch 12 to either HIGH or LOW depending on the quality of the reception signals supplied from the first and second antennae 2, 3.

If, for example, the quality of the reception signals received at the first antenna 2 is better than the quality of the reception signals received at the second antenna 3, then the signal processing circuit 7 sets the antenna selection signal sent to the first switch 11 to HIGH. With the antenna selection signal supplied from the signal processing circuit 7 at HIGH, the moving contact t3 of the first switch 11 is connected to the first fixed contact t1, thus connecting the first antenna 2 to the receiver circuit 6 and supplying the reception signals received at the first antenna 2 to the signal processing circuit 7.

Additionally, if the quality of the reception signals received at the first antenna 2 is worse than the quality of the reception signals received at the second antenna 3, then the signal processing circuit 7 sets the antenna selection signal sent to the first switch 11 to LOW. With the antenna selection signal supplied from the signal processing circuit 7 at LOW, the moving contact t3 of the first switch 11 is connected to the second fixed contact t2, thus connecting the second antenna 3 to the receiver circuit 6 and supplying the reception signals received at the second antenna 3 to the signal processing circuit 7.

However, in the conventional communications device the second switch 12 for switching between transmission and reception and the first switch 11 for selecting either the first or second antenna are connected in series between the first and second antennae 2, 3 on the one hand and the transmitter circuit 5 and receiver circuit 6 on the other. As a result, the transmission and reception signals must pass through both the first and second switches 11, 12 and thus the signals are attenuated by having to pass through two switches.

FIG. 6 is a diagram describing the attenuation in transmission and reception signals caused by the first and second switches when transmitting and receiving conventionally. The conventional communications circuit 1 has connected the first and second switches 11, 12 in series between the first and second antennae 2, 3, on the one hand, and the transmitter circuit 5 and receiver circuit 6, on the other, and as a result signals were attenuated by both the first switch 11 and the second switch 12 when either transmitting or receiving.

It is possible to increase the amplitude of the signals at the transmitter circuit 5 and the receiver circuit 6 in order to offset the attenuation of the signals by the first and second switches. However, increasing the amplitude of the signals also results in increased power consumption.

SUMMARY OF THE INVENTION

Accordingly, it is an object of the present invention to provide a communications device capable of reducing signal attenuation during transmission and reception.

The above-described objects of the present invention are achieved by a communications device comprising:

a plurality of antennae;

a first means for communicating by using a predetermined antenna selected from the plurality of antennae;

a second means for communicating by using one of the plurality of antennae;

a first switch for connecting the predetermined antenna of a plurality of antennae to either the first communicating means or the second communicating means; and a second switch for connecting the second communicating means either to the first switch or to an antenna out of the plurality of antennae other than the predetermined antenna.

According to the invention described above, by connecting the first communicating means to the predetermined antenna via only the first switch when communicating by using the first communicating means, or when using an antenna other than the predetermined antenna used when communicating by using the first communicating means of a plurality of antennae when communicating by using the second communicating means, the signal is attenuated only by the second switch, and thus signal attenuation can be reduced as compared to the conventional arrangement.

Additionally, the above-described object of the present invention is also achieved by the communications device described above further comprising a first control means for controlling the first switch so that the predetermined antenna is connected to the first communicating means when the first communicating means is used for communication and the predetermined antenna is connected to the second switch when the second communicating means is used for communicating.

According to the invention described above, by controlling the first switch using a first control means, the first switch can be automatically controlled.

Additionally, the above-described object of the present invention is also achieved by the communications device as described above further comprising a second control means for controlling the second switch so that the second communicating means is connected either to the first switch or to an antenna out of the plurality of antennae other than the predetermined antenna when the second communicating means is used for communicating.

According to the invention described above, by controlling the second switch by using a second control means, the second switch can be automatically controlled.

Additionally, the above-described object of the present invention is also achieved by the communications device as described above, wherein the predetermined antenna comprises a dual transmission-reception antenna, with the first communicating means performing transmission and the second communicating means performing reception.

Additionally, the above-described object of the present invention is also achieved by the communications device as described above, wherein the first switch is connected between the predetermined antenna and the first and second communication means and the second switch is connected between the second communicating means and the first switch and an antenna out of a plurality of antennae other than the predetermined antenna.

According to the invention described above, the first communicating means can be connected to the dual transmission-reception antenna via only the first switch when transmitting using the first communicating means, and thus signal attenuation can be reduced. Additionally, for reception as well, the second communicating means can be connected to the dual transmission-reception antenna via only the second switch when receiving using an antenna other than the predetermined antenna and the second communicating means, and thus signal attenuation during reception can be reduced.

Other objects, features and advantages of the present invention will become more apparent from the following detailed description when read in conjunction with the accompanying drawings.

BRIEF DESCRIPTION OF THE DRAWINGS

FIG. 3 is a diagram describing the operation of an embodiment of the present invention;

FIG. 6. is a diagram describing the operation of a conventional communications device.

DESCRIPTION OF THE PREFERRED EMBODIMENTS

A detailed description will now be given of an embodiment of a communications device according to the present invention, with reference to FIG. 1 through FIG. 3.

Figure 1:
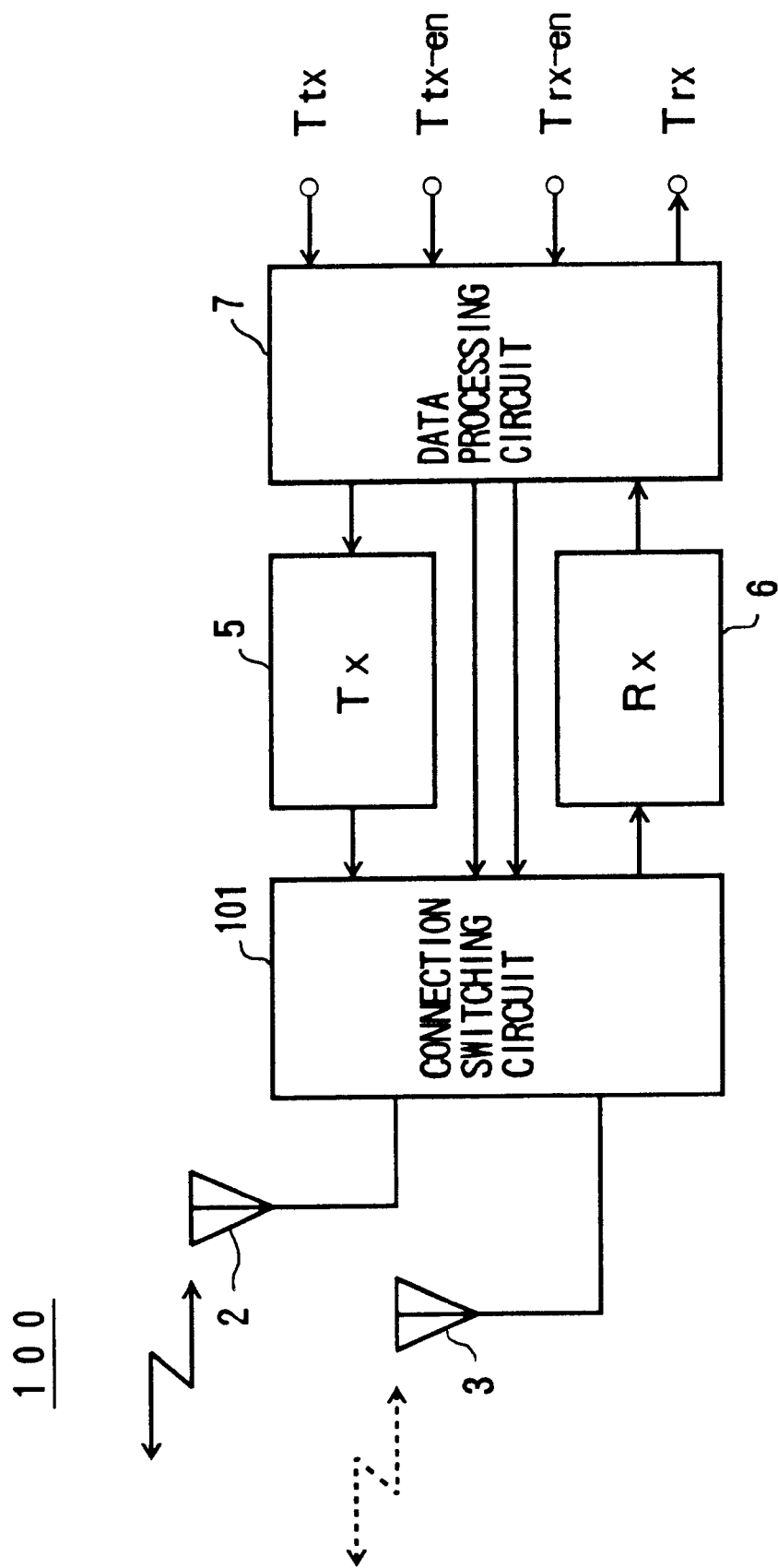
FIG. 1 is a system block diagram of an embodiment of the present invention.

FIG. 1 is a system block diagram of an embodiment of the present invention. Components identical to those depicted in FIG. 4 are numbered identically and descriptions thereof omitted.

Figure 4:
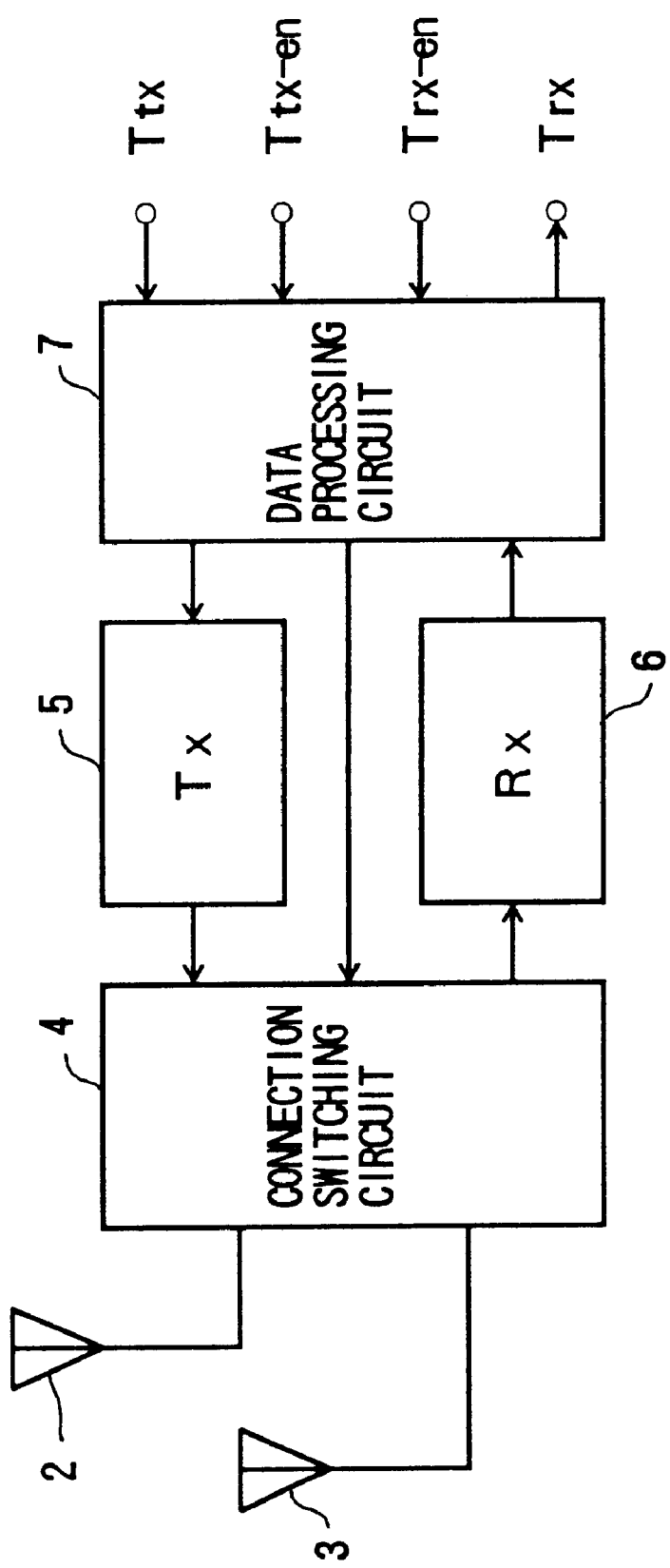
FIG. 4 is a block diagram of a conventional communications device.
Figure 5:
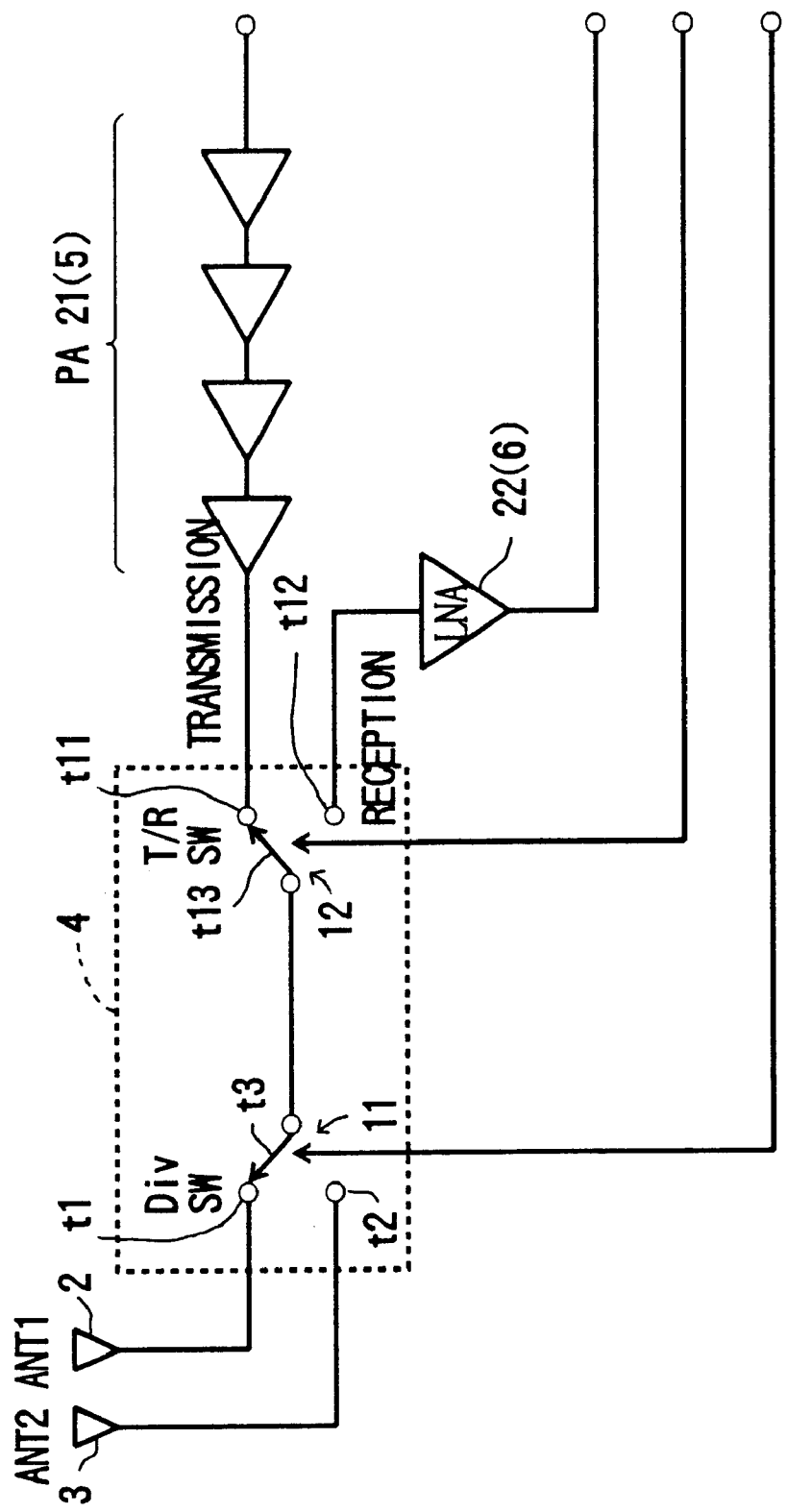
FIG. 5 is a block diagram of an essential part of a conventional communications device.

It should be noted that the connection switching circuit 101 of the communications device 100 of the present embodiment differs from the communications device shown in FIG. 4.

Figure 2:
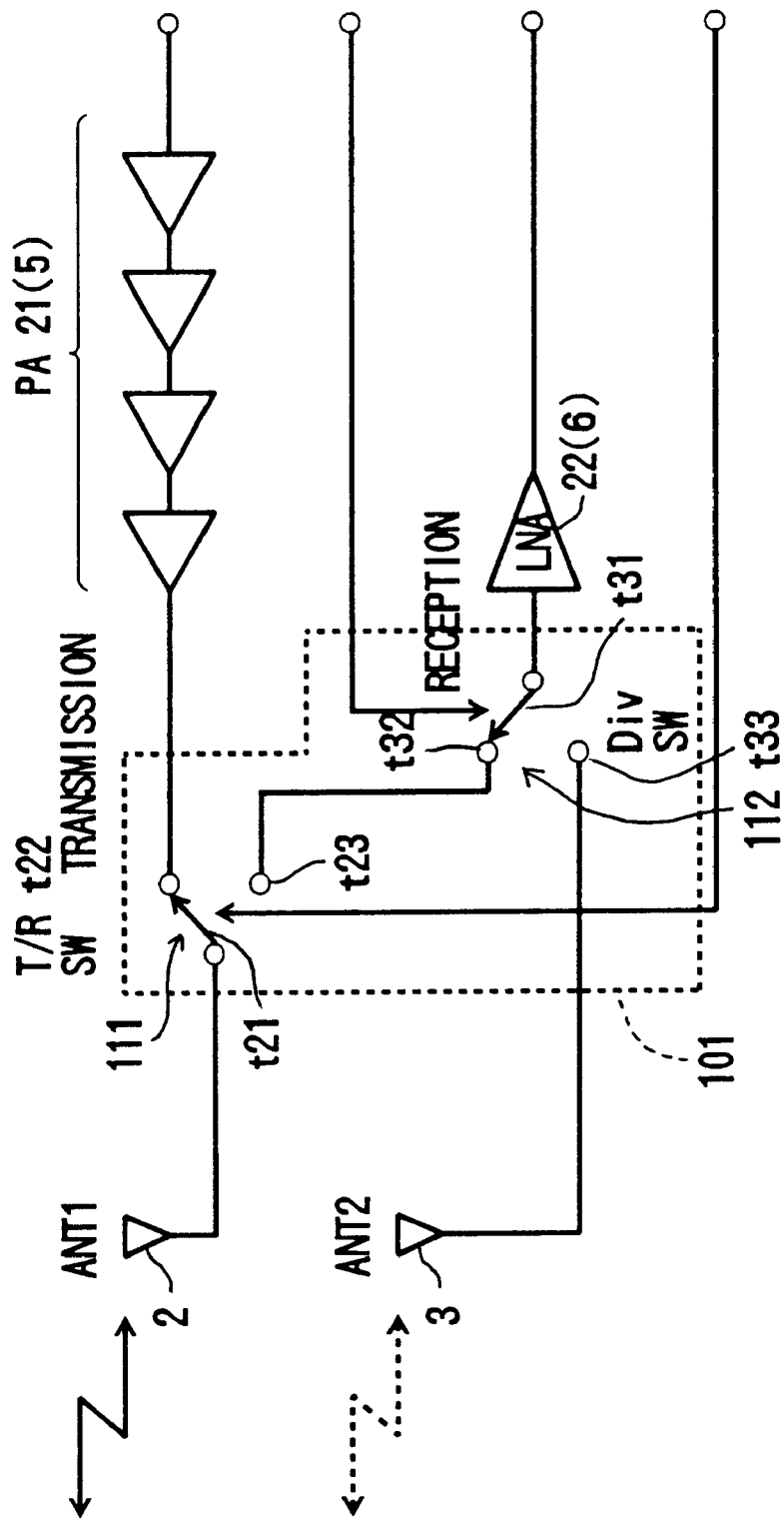
FIG. 2 is a block diagram of an essential part of an embodiment of the present invention.

FIG. 2 is a block diagram of the connection switching circuit according to an embodiment of the present invention.

Connection switching circuit 101 comprises a first switch 111 and a second switch 112. The first switch 111 corresponds to the first switch as claimed in the claims, and switches during transmission and reception.

In the first switch 111, the moving contact t21 is connected to the first antenna 2, the first fixed contact t22 is connected to the transmitter circuit 5 and the second fixed contact t23 is connected to the second switch 112.

The moving contact t21 of first switch 111 is connected to either the first fixed contact t22 or the second fixed contact t23 according to the transmission-reception switching control signal supplied by the signal processing circuit 7.

The second switch 112 corresponds to the second switch as claimed in the claims, and switches in order to select the reception antenna.

In the second switch 112, the moving contact t31 is connected to the receiver circuit 6, the first fixed contact t32 is connected to the second fixed contact t23 of the first switch 111 and the second fixed contact t33 is connected to the second antenna 3.

The moving contact t31 of second switch 112 is connected to either the first fixed contact t32 or the second fixed contact t33 according to the antenna switching control signal supplied by the signal processing circuit 7.

The signal processing circuit 7 switches the processing mode to the transmit mode and sets the transmission-reception switching control signal supplied to the first switch 111 to HIGH when the level of the transmission enable signal supplied to the external switching terminal Ttx is HIGH and the level of the reception enable signal supplied to the external switching signal is LOW. When the transmission-reception switching control signal is HIGH, the first switch 111 connects the moving contract t21 to the first fixed contact t22. When the moving contact t21 is connected to the first fixed contact t22, the first antenna 2 is connected to the transmitter circuit 5 via only the first switch.

Additionally, the signal processing circuit 7 switches the processing mode to the receive mode and sets the transmission-reception switching control signal supplied to the first switch 111 to LOW when the level of the transmission enable signal supplied to the external switching terminal Ttx is LOW and the level of the reception enable signal supplied to the external switching signal is HIGH. When the transmission-reception switching control signal is LOW, the first switch 111 connects the moving contact t21 to the second fixed contact t23. When the moving contact t21 is connected to the second fixed contact t23, the first antenna 2 is connected to the first fixed contact t32 of the second switch 112 via the first switch 111.

When the processing mode changes to the receive mode, the signal processing circuit 7 first inverts the antenna selection signal from HIGH to LOW. The antenna selection processing signal output from the signal processing circuit 7 is supplied to the second switch 112.

When the antenna selection signal is HIGH, the second switch 112 connects the moving contact t31 to the first fixed contact t32. At this time the transmission-reception switching control signal is at a level LOW, so the moving contact t21 of the first switch 111 is connected to the second fixed contact t23 and the first antenna 2 is connected to the receiver circuit 6 via the first and second switches 111, 112. In so doing, the reception signals received at the first antenna 2 are supplied to the signal processing circuit 7 via the receiver circuit 6.

When the antenna selection signal is at a level LOW, the second switch 112 connects the moving contact t31 to the second fixed contact t33. When the moving contact t31 of the second switch 112 is connected to the second fixed contact t33, the second antenna 3 is connected to the receiver circuit 6 via the second switch 112. As a result, the reception signals received at the second antenna 3 are supplied to the signal processing circuit 7 via the receiver circuit 6.

The signal processing circuit 7 compares the reception signals supplied by the first antenna 2 and the reception signals supplied by the second antenna 3 and detects the antenna with the higher reception signal strength.

When the strength of the reception signals supplied from the first antenna 2 is greater than the strength of the reception signals supplied from the second antenna 3, the signal processing circuit 7 sets the antenna selection signal to HIGH.

When the antenna selection signal is HIGH, the second switch 112 connects the moving contact t31 to the first fixed contact t32. At this time, the transmission-reception switching control signal is at a level LOW, so the moving contact t21 of the first switch 111 is connected to the second fixed contact t23 and the first antenna 2 is connected to the receiver circuit 6 via the first and second switches 111, 112. As a result, the reception signals received at the first antenna 2 are supplied to the signal processing circuit 7 via the receiver circuit 6.

When the strength of the reception signals supplied from the second antenna 3 is greater than the strength of the reception signals supplied from the first antenna 2, the signal processing circuit 7 sets the antenna selection signal to LOW.

When the antenna selection signal is LOW, the second switch 112 connects the moving contact t31 to the second fixed contact t33. When the moving contact t31 of the second switch 112 is connected to the second fixed contact t33, the second antenna is connected to the receiver circuit 6 via the second switch 112. As a result, the reception signals received at the second antenna 3 are supplied to the signal processing circuit 7 via the receiver circuit 6.

FIG. 3 is a diagram describing the operation of an embodiment of the present invention, and more specifically, the attenuation of reception and transmission signals caused by the first and second switches 111, 112 of an embodiment of the present invention.

According to the embodiment of the present invention as described above, and as shown in FIG. 3, when transmitting, the first antenna 2 is connected to the transmitter circuit 5 via only the first switch 111. As a result, the transmission signal output from the transmitter circuit 5 is attenuated by only a single switch and thus signal attenuation can be reduced to a minimum. For example, the attenuation caused by one switch is approximately 1–2 dB depending on the transmission signal frequency. Accordingly, signal attenuation can be reduced by approximately 1–2 dB compared to the conventional arrangement, in which the signals must pass through two switches.

Additionally, when receiving as well, when the second antenna 3 is selected the signals received at the second antenna 3 are supplied to the receiver circuit 6 via only the second switch 112. As a result, the signal is attenuated by only a single switch and thus signal attenuation can be reduced to a minimum.

Additionally, according to the present invention, simply by changing the connections of the first and second switches 111, 112 the transmission-reception switching control signal and antenna selection signal can be applied as is, and thus can be easily adapted for use with a conventional communications devices.

The above description is provided in order to enable any person skilled in the art to make and use the invention and sets forth the best mode contemplated by the inventors of carrying out their invention. The present invention is not limited to the specifically disclosed embodiments, and variations and modifications may be made without departing from the scope of the present invention.

The present application is based on Japanese priority application No. 10-115516 filed on Apr. 24, 1998, the entire contents of which are hereby incorporated by reference.

What is claimed is:

1. A radio communication device for communicating by selecting a predetermined antenna from a plurality of antennae, the communication device comprising:

a transmission circuit (5) providing communications signals to be transmitted;

a first antenna (2) of the plurality of antennae;

a first switch (111) having a first signal switching path (t21–t22) and a second signal switching path (t21–t23), said first switch being selectively switchable between said first signal switching path and said second signal switching path, said first signal switching path connecting said transmission circuit to said first antenna so by a connection using only a single signal switching path, thereby to limit attenuation of the transmitted communications signals;

a receiving circuit (6) for receiving communications signals;

a second antenna of the plurality of antennae (3);

a second switch (112) having a first signal switching path (t31–t33) and a second signal switching path (t31–t32), said second switch being selectively switchable between said first signal switching path and said second signal switching path, said first signal switching path connecting said receiving circuit to said second antenna for allowing said receiving circuit to receive communication signals by a connection using only a single signal switching path, thereby to limit attenuation of the received communications signals; and means for connecting the second signal switching path of said first switch and said second signal switching path of said second switch together to allow said receiving circuit to be connected to said first antenna to receive communications signals, whereby communication signals received by said receiving circuit pass along two signal switching paths only when said receiving circuit is connected to said first antenna.

2. The communications device as claimed in claim 1, further comprising a means for controlling the first switch so that the first antenna is connected to the transmission circuit when the transmission circuit is used for communication and the first antenna is connected to the second switch when the receiving circuit is used for communicating.

3. The communications device as claimed in claim 1, further comprising a means for controlling the second switch so that the receiving circuit is connected either to the first switch or to the second antenna when the receiving circuit is used for communicating.

4. The communications device as claimed in claim 1, wherein the first antenna comprises a dual transmission-reception antenna, the transmission circuit performing transmission via the first antenna and the receiving circuit performing reception via the first antenna.

5. The communications device as claimed in claim 1, wherein the first switch comprises a movable contact, a first fixed contact, and a second fixed contact forming said first and second signal switching paths of said first switch and wherein the second switch comprises a movable contact, first fixed contact, and a second fixed contact forming said first and second signal switching paths of said second switch.

6. The communications device as claimed in claim 5, wherein the movable contact of the first switch is connected with the first antenna, the first fixed contact of the first switch is connected with the transmission circuit, the second fixed contact of the first switch is connected with the first fixed contact of the second switch, the movable contact of the second switch is connected with the receiving circuit, and the second fixed contact of the second switch is connected with the second antenna.

* * * * *